Patented Jan. 14, 1941

2,228,706

UNITED STATES PATENT OFFICE 2,228,706

CORTICAL HORMONE

Tadeus Reichstein, Basel, Switzerland, assignor to the firm Roche-Organon, Inc., Nutley, N. J.

No Drawing. Application September 5, 1939, Serial No. 293,505. In the Netherlands September 29, 1938

4 Claims. (Cl. 260—397)

This invention relates to a new cortical hormone, occurring in adrenal cortical extracts.

Hormones, and a fraction containing hormones, from cortical extracts, have been described and claimed in my Patent No. 2,166,877, dated July 18, 1939, application filed September 19, 1938, Serial Number 230,722.

The present invention is a further development of the invention described in said patent.

It has been found that the hydroxy-ketone fraction from cortical extracts, described in my above-mentioned patent, contains a further physiologically active constituent which is not identical with the compounds hitherto known. This new hormone, though, is also related to the sterols and it even resembles so closely one of the known compounds in its physical properties that its true nature as a new compound only became evident upon degradation experiments.

The method by which this new compound can be isolated in the pure state is essentially analogous to the methods used before and described e. g. in my Letters Patent No. 2,166,877.

The starting material is again the oxyketone fraction described and claimed in said Letters Patent. By acetylation and chromatographic adsorption of the acetate a fraction can be obtained crystallizing in colourless needles which upon heating become opaque at about 100° C. and melt at 238–240° C. (corr.).

The same melting characteristics are displayed by the known compound acetoxy-21-pregnene-4-trione-3.11.20-ol-17 (i. e. the 21-acetate of the compound known and described as "Substanz Fa").

Thus when first isolating the new compound I supposed it was identical with this compound. However, the free alcohol obtained from the acetate by saponification melting at 210° C. (corr.) with slight decomposition (the melting point may be found somewhat different depending on the velocity of heating), was shown by analysis to contain only 4 oxygen atoms. Further it shows the properties of the whole series of cortical hormones, i. e. it possesses a ketol side chain at $C_{17}$ and an $\alpha$-$\beta$-unsaturated ketone configuration. The position of the fourth oxygen atom follows from the result of careful degradation with chromic anhydride. From the reaction mixture the known compound androstene-4-dione-3.17 was isolated. Its identity was proven by mixed melting point determinations. This result excludes any position of the fourth oxygen atom other than the 17-position. The compound thus proves to be pregnene-4-diol-17.21-dione-3.20. It can be considered as a companion to the hormones described in my Patent No. 2,166,877, corticosterone which probably is pregnene-4-diol-11.21-dione-3.20, and oxycorticosterone which probably is pregnene-4-triol-11.17.21-dione-3.20.

The new hormone may be reconverted into the acetate by usual mild acetylation, and also into other esters by reaction with suitable acylating agents. The melting point of the acetate, 238–240° C., as mentioned before, as well as that of the other esters, is somewhat dependent on the velocity of heating, analogous to the properties of the parent compound.

The method by which I have obtained the new hormone will follow more clearly from the following example.

Example

The starting material is the oxyketone fraction described in my Patent No. 2,166,877. This fraction is acetylated as described in said patent and the mixture of acetates is dissolved in a solvent consisting of equal parts of benzene and pentane, whereupon the solution is filtered through a column of activated aluminium oxide (according to Brockmann). Thereupon elution is effected with benzene whereby, as already described in my above-mentioned patent, the acetoxy-21-pregnene-4-dione-3.20 is obtained. Subsequent elutions are now effected with benzene, mixtures of benzene and ether in the proportions 9:1, 8:2, 7:3 and 5:5, with absolute ether and finally with a mixture of ether and acetone in the proportion 1:1. From the extracts with benzene-ether 5:5, with absolute ether and from the first extracts with ether-acetone 1:1 the acetoxy-21-pregnene-4-ol-17-dione-3.20 is obtained in the pure state e. g. by recrystallisation from acetone. From 2.7 g. of oxyketone fraction some 50 mg. of the new hormone are obtained in this way. The acetate so obtained forms colourless needles becoming opaque already below 100° C. and melting at 238–240° C. (corr.).

From this acetate the free pregnene-4-diol-17.21-dione-3.20 is obtained by saponification with potassium bicarbonate in methanol at room temperature. Upon recrystallisation of the product from absolute ethanol colourless crystals are obtained which melt at about 210° C. (corr.), the melting point being somewhat dependent on the velocity of heating.

I claim:

1. The cyclopentanodimethylpolyhydrophenanthrene compounds having the general formula $C_{21}H_{29}O_4R$ and the structure

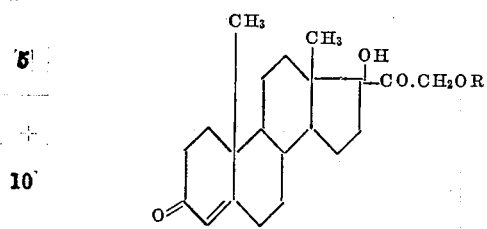

in which R belongs to the class consisting of hydrogen and acyl groups.

2. Pregnene-4-diol-17.21-dione-3.20.
3. Acetoxy-21-pregnene-4-ol-17-dione-3.20.

4. The cyclopentanodimethylpolyhydrophenanthrene compounds having the general formula $C_{21}H_{28}O_4R_2$ and the structure

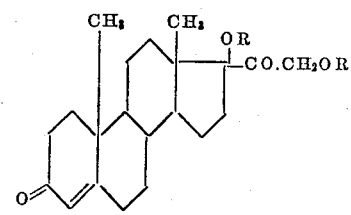

in which R belongs to the class consisting of hydrogen and acyl groups.

TADEUS REICHSTEIN.